INVENTOR.
MAYNARD J. DE GOOD
BY
ATTORNEYS

INVENTOR.
MAYNARD J. DE GOOD

United States Patent Office 3,338,471
Patented Aug. 29, 1967

3,338,471
SEPARATELY CONTROLLED PLURAL ARTICLE DISCHARGE MEANS
Maynard J. De Good, Grand Rapids, Mich., assignor to Rapistan Incorporated, a corporation of Michigan
Filed Oct. 22, 1965, Ser. No. 511,268
1 Claim. (Cl. 221—129)

This invention relates to release mechanisms and particularly to a release mechanism designed to regulate and control the release of individual articles from a storage rack. It is particularly designed for what is commonly termed a live storage rack, that is, one in which the article upon release is either forcibly ejected from the rack or is urged to shift off the rack by the force of gravity.

Live storage racks have been widely adopted in many fields including warehousing and industrial materials storage. In such installations, the tracks are arranged in groups sometimes with hundreds of individual storage tracks being utilized. In many cases, these storage facilities are automated whereby the articles can be released in controlled quantities from any one or more selected tracks, the selection and release of the articles being effected from some central control point remote from the rack. In developing mass storage of this type with partial or fully automated release mechanisms, the problem has been to provide a release mechanism which is accurate and dependable, and at the same time, is not so complex and costly as to make its initial installation cost prohibitive. Another problem has been to develop a release mechanism such that it may be accurately and positively controlled by a light-duty, relatively inexpensive actuator. Relieving the actuators of heavy-duty performance requirements greatly increases the life expectancy of the actuators. Unless positive release and accurate count of the released articles is effected by the release mechanism, the benefits to be derived from remote control are largely negated because personnel have to be provided to recount and verify the operation of the track discharge mechanisms.

This invention provides a simple and positive release. It is so constructed that it is accurate in the number of articles released. This invention permits a large number of release mechanisms to be actuated by a single prime mover, yet permitting each release mechanism to operate independently of all the others. This materially reduces the initial investment cost, and the subsequent operating costs of the structure. It permits the actuating control mechanism for each release to be relieved of the duty of supporting the line pressure of the articles on the rack. This means that relatively low cost, light-duty actuators may be employed. This again materially reduces the initial investment in the over-all system. At the same time, by reducing the demand on these mechanisms, the life expectancy of the actuators is greatly extended.

The invention has another important facet. This is the fact that it responds rapidly to its control signals. This permits rapid, yet accurate, discharge of articles from the storage track. It positively ejects the articles from the track, assuring dependable release of the articles in response to the signals which it is receiving.

These and other objects and purposes of this invention will be understood by those acquainted with the problems of conveyorization, and particularly, the problems of conveyorized storage upon reading the following specification and the accompanying drawings.

Figure 1:
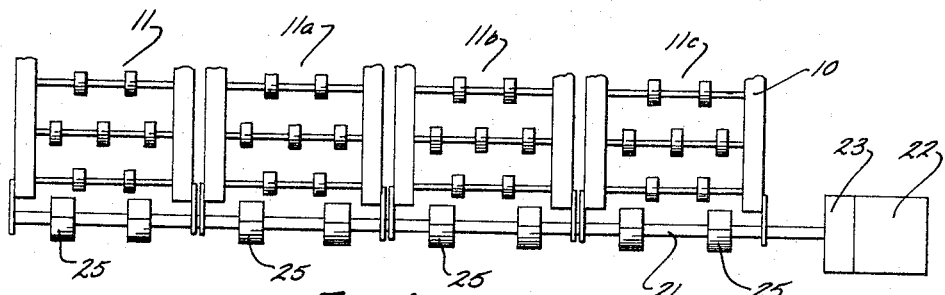
FIG. 1 is a schematic view of a plurality of storage tracks each having this invention applied as the release mechanism.
Figure 2:
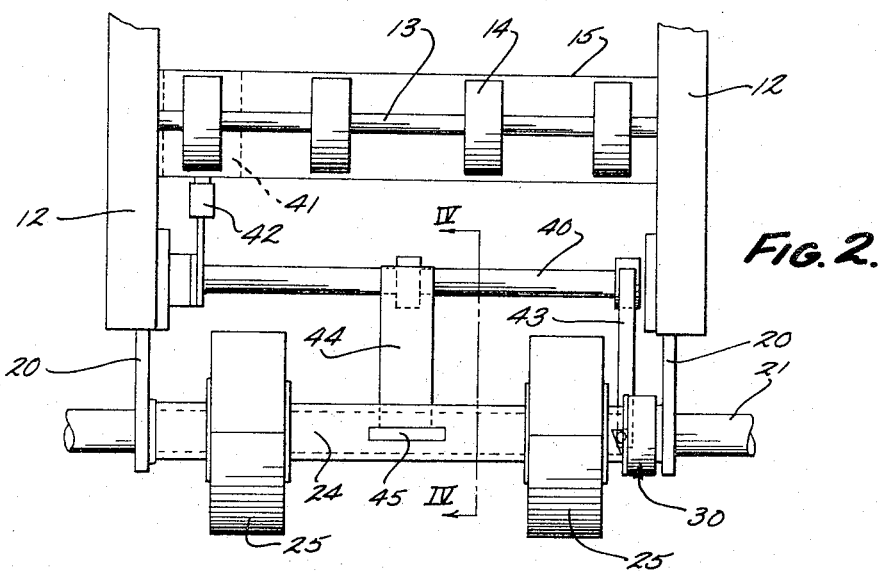
FIG. 2 is an enlarged, fragmentary, plan view of the discharge end of a storage track equipped with this invention.

In embodying this invention in practical form, there is provided a shaft driven by a prime mover. Mounted on this shaft, but free for rotation relative to the shaft, is an article release control wheel which is connected to the shaft through a clutch. When the clutch is engaged, the shaft positively drives the release wheel to release and propel articles from the track. When the clutch is disengaged, the article release wheels are disengaged from the shaft and by means of a stop mechanism are held against rotation. The release wheels in this position positively hold the articles against release from the track.

Referring specifically to the drawings, the numeral 10 indicates a storage rack having a plurality of article supporting tracks 11, 11a, 11b and 11c. While these tracks may be of any of a number of conventional constructions, the particular tracks illustrated each have a pair of side rails 12 connected by axles 13 on which are mounted conveyor wheels 14. The conveyor wheels are freely rotatable with respect to the axles 13. The side rails 12 may be connected at suitable intervals by cross braces 15.

All of the tracks 11 through 11c terminate in a common plane as indicated in FIG. 1. Projecting outwardly from the end of each of the side rails 12 is a bracket 20. The ends of the brackets 20 of all of the tracks 11 through 11c collectively mount a shaft 21. This shaft is driven by a prime mover 22 through some type of a suitable speed reducer 23.

Tubular sleeves 24 are rotatably mounted on the shaft 21 between each pair of the brackets 20. The sleeve of each of the tracks 11 through 11c is operatively independent of the sleeves of the other tracks. On each of these sleeves is an article discharging member or wheel 25. Each of the wheels 25 has at least one article interceptor dog 26 and in the particular construction illustrated, each of these wheels has a pair of the dogs 26 positioned diametrically opposite each other. Each of the dogs has a stop wall 27 of such height that it extends above the article supporting plane formed by the tops of the wheels 14 where it will engage and restrain an article on the track. It will be noted that the wheels 25 are of eccentric contour between the dogs 26. Thus, as the wheels rotate, the surface will move up and engage an article overlying the wheel. Preferably, these wheels are fabricated of or have a surface characterized by a high coefficient of friction, such as a suitable rubber-like compound.

Figure 5:
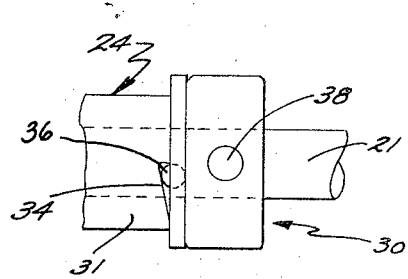
FIG. 5 is a fragmentary, oblique view of the clutch used in this invention.
Figure 6:
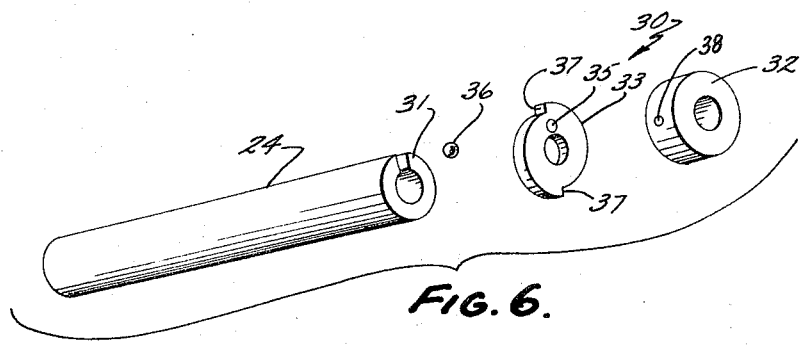
FIG. 6 is a fragmentary, exploded, oblique view of the clutch mechanism illustrated in FIG. 5.

At one end of each of the sleeves 24 is a clutch 30. As best seen in FIGS. 5 and 6, the clutch consists of a driven member 31, a driving member 32 and a control ring 33. In the particular construction illustrated, the driven member 31 is integral with the sleeve 24, although this is not essential in executing this invention. The driven member 31 has a wedge-shaped slot 34 in the face directed toward the control ring 33. This wedge-shaped slot 34 is of decreasing width in the direction of rotation of the driving member 32 (the direction of rotation being indicated by the arrow in FIG. 6).

The control ring 33 has a central opening permitting it to seat upon but be freely rotatable with respect to the shaft 21. It also has an eccentric opening 35 in which is seated a catination member such as the ball 36. The diameter of the catination member 36 is less than that of the hole 35 affording it free movement in the hole. Its diameter is greater than the thickness of the control ring 33 and of the spacing between the adjacent faces of the driven member 31 and the driving member 32 other than in the deeper portion of the wedge-shaped slot 34. Thus, when the ball is located in the deeper portion of the wedge-shaped slot 34, it has no tight bearing against either the driven or the driving member. However, when it shifts toward the shallower end of the wedge-shaped slot 34, it tightly engages both the driving and the driven member forming a wedging lock between them. When so wedged, the motion of the driving member 32 is transmitted through the catination member 36 to the driven member 31.

The control ring 33 serves only the purpose of determining whether the ball is to be positioned in the deeper or the shallower end of the wedge-shaped slot 34. It does not transmit motion between the driven and driving members. The control ring has a pair of ratchet teeth 37, each positioned diametrically opposite from the other. If the release wheels 25 are of a type which have only a single interceptor dog 26, the control ring 33 will have only a single ratchet tooth 37. The necessary interrelationship of these two components will become clear in the subsequent description. The driving member 32 is secured to the shaft 21 for rotation therewith by any suitable means such as the pin 38.

On each of the individual tracks 11 through 11c a separate rocking roll 40 is mounted at a point spaced from but parallel to the shaft 21. While the shaft 21 is common to all of the tracks, each of the tracks has its own independent and separably operable rocking rod. Each of the rocking rods is connected to an operating solenoid 41 by a suitable linkage 42. Mounted on each of the rocking rods for movement therewith are a pair of levers, a control lever 43, and a locking lever 44. In one operative position of the control lever 43, the free end of the lever intercepts and engages one of the ratchet teeth 37 on the control ring 33 of the clutch. In the other position, it is disengaged from the control ring. Also, in one position of the locking lever 44, its free end engages one of the two stop bars 45 secured to the sleeve 24. The stop bars are mounted at diametrically opposite positions on the sleeve 24. In the other position of the locking lever, it is disengaged from the stop bars. It is important that the control lever and the locking lever operate together whereby both are either engaged or disengaged simultaneously. The lever are urged into engaged position by the spring 46 which effects their shifting into engaged position when the solenoid 41 is deactivated or released.

Figure 4:
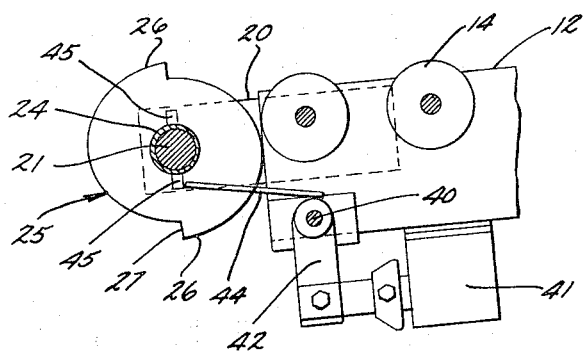
FIG. 4 is a sectional, elevation view taken along the plane IV—IV of FIG. 2.

It will be noted from FIG. 4 that the locking lever engages the stop bar beneath the sleeve. Thus, it holds the sleeve and wheels against rotation in the direction of movement of the articles attempting to discharge from the storage track.

Figure 7:
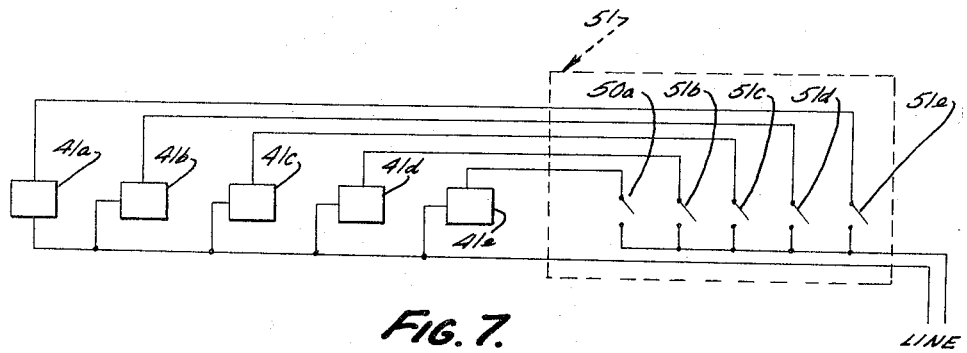
FIG. 7 is a wiring diagram of a control mechanism for this invention.

Many different types of control mechanisms may be utilized to control the operation of the release mechanism for each individual track. A simple but exemplary control mechanism is schematically illustrated in FIG. 7. In this, a number of solenoids 41a through 41e are illustrated. Each of these solenoids controls the operation of the release mechanism of an individual track. Each of these solenoids is separately and individually regulated through one of the switches 50a through 50e located in the control panel 51. It will be recognized that this control panel can be located either adjacent the tracks or at any suitable remote point. The operation of this release mechanism need not necessarily be regulated by a solenoid. It will be recognized that any suitable operating mechanism powered pneumatically, hydraulically or even mechanically may be substituted for the electrical control system proposed in FIG. 7.

Figure 3:
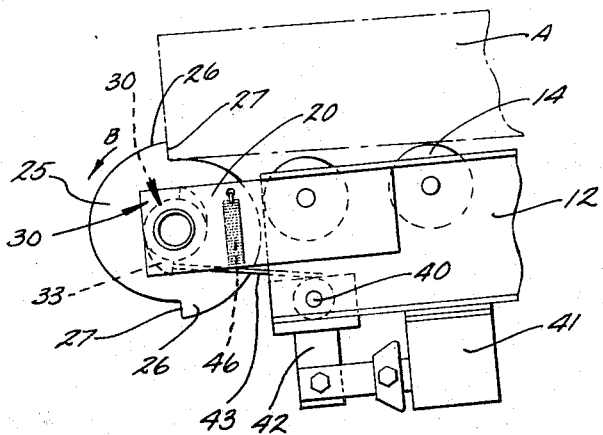
FIG. 3 is a fragmentary, end elevation view of the structure shown in FIG. 2.

The operation of this device is as follows. Assuming the release mechanism to be in the position illustrated in FIG 3, the clutch is in disengaged position or attitude because the control lever is engaged with one of the ratchet teeth of the control ring 33. Simultaneously, the locking lever 44 is engaged with one of the stop bars 45, holding the wheels 25 against rotation. Thus, the article A, even though biased by gravity or other means toward the end of the storage track, is positively held against discharge. It will be noted that the pressure of the article A and of course of all other articles which may be slugged against article A further up the storage track is not assumed by the clutch 30, but is assumed by the engagement of the stop bar 45 with the locking lever 44. During this period, the shaft 21 is constantly rotated by the prime mover. However, because the control ring of the clutch is held agianst rotation, the clutch is disengaged, and thus, the motion of the shaft 21 is not transmitted to the sleeve 24.

To discharge the article A from the track, the solenoid 41 is actuated. This rocks the rocker rod 40, swinging the ends of the control lever 43 and locking lever 44 downwardly causing them to disengage the clutch and the stop bar respectively. As soon as this happens, the drag of the driving member 32 which is being constantly rotated by the shaft 21 urges the control ring 33 to move with it. As it does so, it moves the ball or catination member 36 toward the shallow end of the wedge-shaped slot 34. This causes the ball to lock the driving member to the driven member, and thus, the motion of the shaft 21 is transmitted to the sleeve 24. Since the release wheels 25 are secured to the sleeve 24 they rotate in the direction of the arrow B in FIG. 3. This removes the dog 26 from the path of the article A permitting it to shift toward the end of the track. Further, as the release wheel 25 continues to rotate, its eccentric shape will bring the surface of the wheel up against the article A where it frictionally engages the article and forcibly pulls the article off the track.

So long as the solenoid 41 is actuated, the release mechanism will continue to propel articles off the track, one after the other. However, as soon as the solenoid is released, the control and locking levers 43 and 44, under the bias of the spring 46, will once again shift up to engage the control ring 33 and the stop bar 45 respectively. This will immediately disengage the sleeve 24 from the shaft 21 and lock the sleeve against further rotation holding back the discharge of additional articles. Because the catination member 36 has only a very short distance to travel to shift from disengaged to engaged position, the clutch 30 reacts almost instantaneously. This makes the discharge mechanism sufficiently accurate and responsive that it can release articles one by one, or can discharge a number of articles with accuracy of count in so doing. This is most important to efficient storage operation.

While it will be recognized that various modifications of this invention may be made, it will be understood that a preferred embodiment of the invention has been illustrated. Such of these modifications as embody the principles of this invention are to be considered as included in the hereinafter appended claim unless this claim by its language expressly states otherwise.

I claim:

A device for discharging articles from each individual track of a storage rack having a plurality of tracks arranged in side-by-side relationship, said device comprising: a driven shaft (21) common to all of said tracks and mounted at the discharge ends of said tracks; a source of rotary motion for constantly driving said shaft; a plurality of rotatable article discharge members (25) supported on said shaft, one at the end of each of said tracks; each of said members having a clutch (30) for connecting the member to said shaft; each clutch having a driving plate (32), a driven plate (31) and a normally rotatable control ring (33) therebetween equipped with a ratchet tooth (37); said control ring having a catination member (36) for connecting said plates for simultaneous rotation only when said ring is free to rotate with said driving plate; a separate control lever (43) shiftable in and out of engagement with said ratchet tooth for controlling the rotation of said control ring and the attitude of each of said clutches for independently engaging and disengaging each member from said shaft for governing the discharge of articles from each of said tracks independently of all of the other of said tracks; stop means (45) on each of said members; a stop lever (44) for each of said members; each of said stop levers being connected to said central lever for the adjacent member for simultaneous movement therewith; each stop lever when engaged with said stop means holding said member connected to said stop means against rotation in article discharging direction.

References Cited

UNITED STATES PATENTS

| | | | |
|---|---|---|---|
| 1,683,715 | 9/1928 | Urban | 192—93 |
| 1,855,047 | 4/1932 | Giles | 221—277 |
| 1,886,378 | 11/1932 | Dearsley | 221—227 X |
| 2,738,103 | 3/1956 | Bisese | 193—53 |
| 2,843,242 | 7/1958 | Gabrielsen et al. | 221—129 X |
| 2,965,262 | 12/1960 | Du Bois | 221—129 X |
| 3,219,234 | 11/1965 | Wichman | 221—129 X |

FOREIGN PATENTS

| | | |
|---|---|---|
| 421,513 | 5/1947 | Italy. |

WALTER SOBIN, *Primary Examiner.*